J. DEMARCO.
CAR TRUCK.
APPLICATION FILED OCT. 24, 1921.
1,428,764. Patented Sept. 12, 1922.
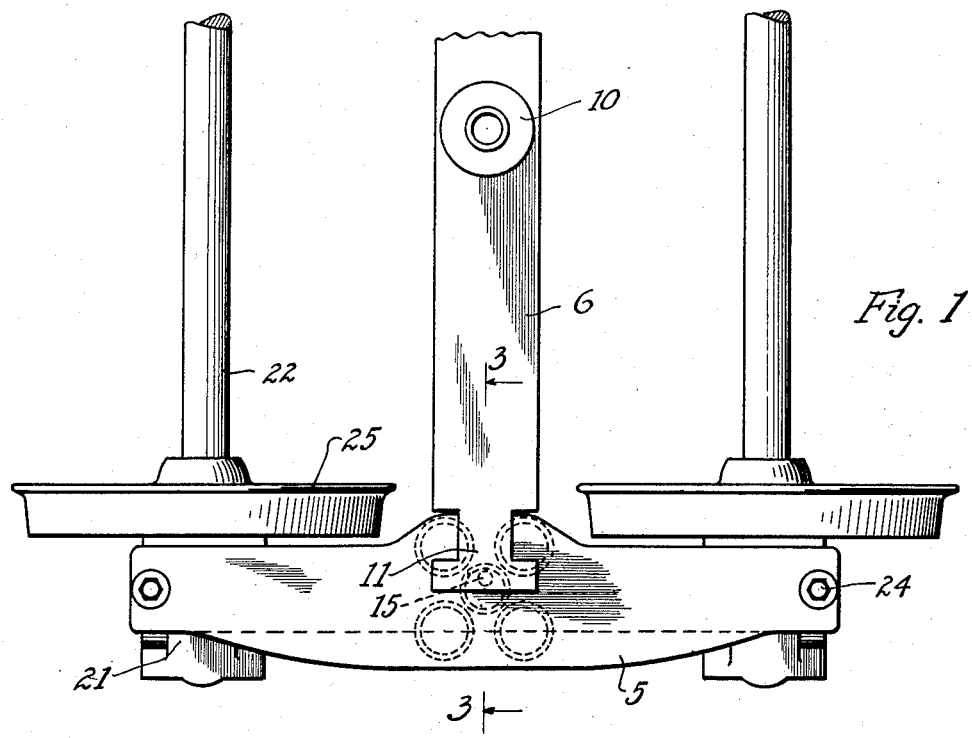
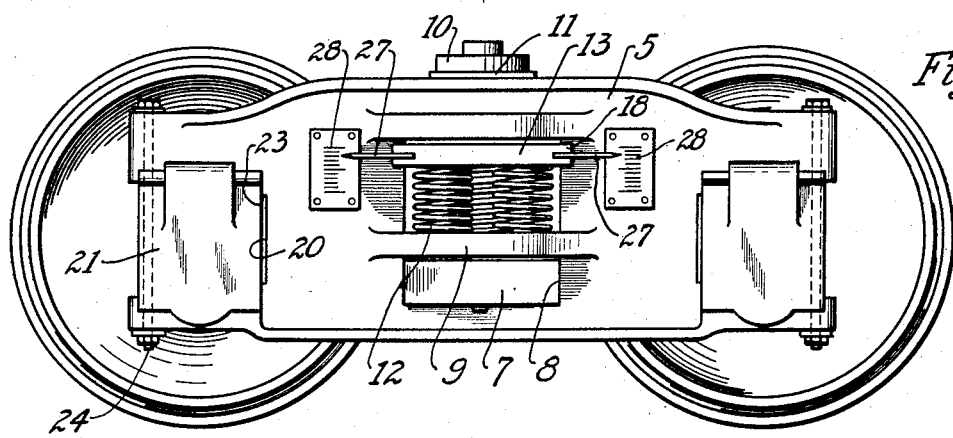
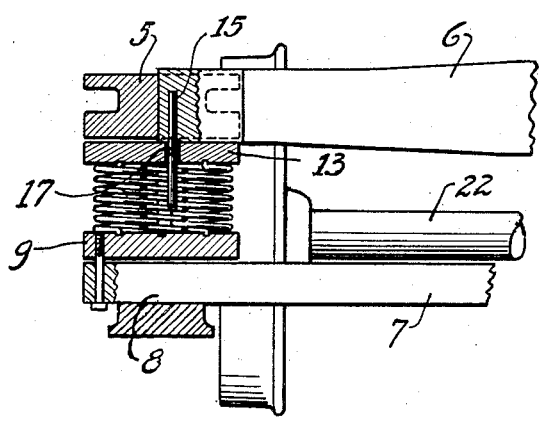
INVENTOR:
Joseph Demarco
By E J Andrews
Att'y.

Patented Sept. 12, 1922.

1,428,764

UNITED STATES PATENT OFFICE.

JOSEPH DEMARCO, OF KOLZE, ILLINOIS.

CAR TRUCK.

Application filed October 24, 1921. Serial No. 509,797.

*To all whom it may concern:*

Be it known that I, JOSEPH DEMARCO, a citizen of the United States, residing at Kolze, in the county of Cook and State of Illinois, have invented certain new and useful Improvements in Car Trucks, of which the following is a specification.

This invention relates to railway trucks and has for its object the production of a simplified and improved railway truck frame, and particularly such a frame so arranged as to be not only very effective and dependable, but also to be easily assembled or taken apart when necessary.

Of the accompanying drawings Fig. 1 is a plan view of one side of a truck which embodies the features of my invention; Fig. 2 is an elevation of the truck side; and Fig. 3 is a sectional view along the line 3—3 of Fig. 1.

The truck comprises the side frames 5 which are connected by means of the bolster-beam 6 and the strengthening beam 7. The strengthening beam 7 is rigidly fixed to the lower portion of the cross-beams 5. The ends of the beam 7 pass through the openings 8 fitting snugly therein, and are bolted to the projecting flange 9 of the cross-beam. In this manner the beam 7 may be easily removed from the cross-beams and at the same time it holds the lower portions of the beams so as to prevent any tipping tendency thereof. The bolster-beam 6 has any suitable bolster-ring arrangement 10 in the central portion thereof, and the ends 11 of the bolster-beam are dovetailed into the cross-beams, the dovetailed connection, however, being sufficiently loose to allow the ends of the bolster-beam to play freely up and down in the dovetailed slots of the cross-beam. The bolster ends are supported by means of springs 12, and a plate 13 is interposed between the springs and the end of the bolster-beam. By this arrangement the bolster-beam is free to move vertically in the truck frame, and the car body, resting on the bolster-beams, thus has the advantage of the resiliency of the springs. A pin 15, fixed to the end of each bolster-beam, passes through an opening 17 in the plate 13 and projects into one of the supporting springs. This pin at all times prevents longitudinal movement of the plate 13 with reference to the bolster-beam; and flanges 18, projecting outside of the cross-beam, assist in holding the plate in place.

By this arrangement the truck frame may be very easily assembled or taken apart, as it is necessary only to elevate the bolster-beam from the frame and remove the plate 13 and the springs 12 in order to replace a broken spring or for any other purpose; it being unnecessary to remove any bolts, so that with the body of the car removed a few moment's time only is necessary to take apart this portion of the truck.

The cross-beam 5 may be cast in one solid piece and it has recesses 20 to receive the bearings 21 of the wheel axle 22. The inner edges of the bearings rest against shoulders 23, and each bearing is prevented from moving outwardly by means of a bolt 24. By this arrangement the bearings may be easily removed from the truck by simply removing the bolts 24 and slipping the bearings, with the axle, outwardly. The wheels 25 are mounted on the axles in an ordinary manner.

In order to indicate at all times the weight of the car body, which rests upon the bolster-beams, indicators 27 and scales 28 are provided at each end of the truck, the scales indicating pounds or tons as may be desired; and the arrangement is such that when the body is removed the indexes will point to zero, so that the indications of the indexes at any time will give the actual weight on the bolster, by adding up the indications on the various truck ends. In this manner the actual weight of the body and contents is always indicated, and it is not necessary to depend upon the marked weight of the body, as this may be incorrect, as the weight may vary with the wear and tear and repair of the car, or the mark may become obliterated.

I claim as my invention:

A car truck comprising a pair of integral side frames, each frame having an opening in its central portion, springs mounted in said opening, a bolster-beam connecting said frames, the ends of said bolster-beam being slidably mounted vertically by dovetailing in the respective frames, and a strengthening beam connecting the lower portions of said frames, the ends of said strengthening beam being fixed to the respective frames, a plate mounted in each of the openings of said frame between said springs and the end of said bolster-beam, with a pin projecting from the end of each of said bolster-beams, through said plate and through a portion of one of said springs.

In testimony whereof, I hereunto set my hand.

JOSEPH DEMARCO.